(12) United States Patent
Pintauro et al.

(10) Patent No.: US 9,252,445 B2
(45) Date of Patent: *Feb. 2, 2016

(54) NANOFIBER MEMBRANE-ELECTRODE-ASSEMBLY AND METHOD OF FABRICATING SAME

(71) Applicant: VANDERBILT UNIVERSITY, Nashville, TN (US)

(72) Inventors: Peter N. Pintauro, Brentwood, TN (US); Jason Ballengee, Nashville, TN (US); Matthew Brodt, Nashville, TN (US)

(73) Assignee: VANDERBILT UNIVERSITY, Nashville, TN (US)

(*) Notice: Subject to any disclaimer, the term of this patent is extended or adjusted under 35 U.S.C. 154(b) by 170 days.

This patent is subject to a terminal disclaimer.

(21) Appl. No.: 13/872,953

(22) Filed: Apr. 29, 2013

(65) Prior Publication Data

US 2014/0038076 A1  Feb. 6, 2014

Related U.S. Application Data

(63) Continuation-in-part of application No. 13/567,857, filed on Aug. 6, 2012, and a continuation-in-part of application No. 13/823,968, filed on Mar. 15, 2013.

(60) Provisional application No. 61/800,884, filed on Mar. 15, 2013.

(51) Int. Cl.
*H01M 8/10* (2006.01)

(52) U.S. Cl.
CPC ............ *H01M 8/1004* (2013.01); *Y02E 60/521* (2013.01)

(58) Field of Classification Search
CPC .................................................... H01M 8/1004
USPC .......................................................... 429/482
See application file for complete search history.

(56) References Cited

U.S. PATENT DOCUMENTS

2010/0196779 A1* 8/2010 Koyama et al. ............... 429/480

FOREIGN PATENT DOCUMENTS

| CN | 1873064 A | 12/2006 |
| CN | 101665232 A | 3/2010 |

OTHER PUBLICATIONS

Lee, K.M.; Choi, J; Wycisk, R.; Pintauro, P.N., and Mather, P.T.; "Nafion Nanofiber Membranes", In ECS: 2009, vol. 25, pp. 1451-1458.*
State Intellectual Property Office of P.R. China, Office Action for Chinese Application No. 201180062942.7, issued on Jun. 9, 2014.
C.G. Arges et al., Anion Exchange Membrane Fuel Cells, The Electrochemical Society Interface, 2010, 31-35, vol. 19.
M.R. Hibbs et al., Transport Properties of Hydroxide and Proton Conducting Membranes, Chem. Chem Mater. Mar. 11, 2008, 2566-2573, vol. 20.

(Continued)

*Primary Examiner* — Jonathan Jelsma
(74) *Attorney, Agent, or Firm* — Locke Lord LLP; Tim Tingkang Xia, Esq.

(57) ABSTRACT

In one aspect of the present invention, a fuel cell membrane-electrode-assembly (MEA) has an anode electrode, a cathode electrode, and a membrane disposed between the anode electrode and the cathode electrode. At least one of the anode electrode, the cathode electrode and the membrane is formed of electrospun nanofibers.

14 Claims, 2 Drawing Sheets

(56) References Cited

OTHER PUBLICATIONS

Daoping Tang et al., Alkaline polymer electrolyte fuel cells: Principle, challenges, and recent progress, Feb. 2010, 357-364, vol. 53, No. 2.

Jason B. Ballengee et al., Composite Fuel Cell Membranes from Dual-Nanoiber Electrospun Mats, Macromolecules, 2011, 7307-7314, vol. 44.

Wenjing Zhang, High-Performance Nanofiber Fuel Cell Electrodes, ChemSusChem, 2011, 1753-1757, vol. 4.

* cited by examiner

FIG. 1

FIG. 2

NANOFIBER MEMBRANE-ELECTRODE-ASSEMBLY AND METHOD OF FABRICATING SAME

CROSS-REFERENCE TO RELATED PATENT APPLICATIONS

This application claims the benefit, pursuant to 35 U.S.C. §119(e), of U.S. provisional patent application Ser. No. 61/800,884, filed Mar. 15, 2013, entitled "NANOFIBER MEMBRANE-ELECTRODE-ASSEMBLY AND METHOD OF FABRICATING SAME," by Peter N. Pintauro, Jason Ballengee and Matthew Brodt, the above disclosure of which is incorporated herein in its entireties by reference.

This application also is a continuation-in-part of U.S. patent application Ser. No. 13/567,857, filed Aug. 6, 2012, entitled "MEMBRANES, METHODS OF MAKING SAME, AND APPLICATIONS OF SAME," by Peter N. Pintauro and Andrew Park, which itself claims priority to and the benefit of, pursuant to 35 U.S.C. §119(e), U.S. provisional patent application Ser. No. 61/515,804, filed Aug. 5, 2011, entitled "NANOFIBER/NANOCAPILLARY NETWORK PROTON EXCHANGE MEMBRANE, MAKING OF SAME, AND APPLICATIONS OF SAME," by Peter N. Pintauro and Andrew Park, all the above disclosures of which are incorporated herein in their entireties by reference.

This application also is a continuation-in-part of U.S. patent application Ser. No. 13/823,968, filed Mar. 15, 2013, which is a U.S. national stage application under 35 U.S.C. §371 of PCT patent application Serial No. PCT/US11/58088, filed Oct. 27, 2011, entitled "NANOFIBER ELECTRODE AND METHOD OF FORMING SAME," by Peter N. Pintauro and Wenjing Zhang, which itself claims the benefit, pursuant to 35 U.S.C. §119(e), of U.S. provisional patent application Ser. No. 61/407,332, filed Oct. 27, 2010, entitled "NANOFIBER FUEL CELL ELECTRODE AND METHOD OF FORMING SAME," by Peter N. Pintauro and Wenjing Zhang, all the above disclosures of which are incorporated herein in their entireties by reference.

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference. In terms of notation, hereinafter, "[n]" represents the nth reference cited in the reference list. For example, [4] represents the 4th reference cited in the reference list, namely, J. B. Ballengee and P. N. Pintauro, *Macromolecules*, 44, 7307 (2011).

STATEMENT OF FEDERALLY-SPONSORED RESEARCH

The invention was made with government support under Grant No. DE-FG36-06GO16030 awarded by U.S. Department of Energy (DOE). The government has certain rights in the invention.

FIELD OF THE INVENTION

The present invention relates generally fuel cells. More specifically, the present invention relates to a fuel cell membrane-electrode-assembly (MEA) having an electrospun nanofiber membrane, an anode electrode and a cathode electrode, where at least one electrode is formed of electrospun nanofibers.

BACKGROUND OF THE INVENTION

Fossil fuels are currently the predominant source of energy in the world. Due to concerns such as carbon dioxide emissions and the finite nature of the supply of fossil fuel, research and development and commercialization of alternative sources of energy have grown significantly over the past decades. One focus of research and development is hydrogen fuel cells, which can quietly and efficiently generate electrical power while producing only heat and water as significant byproducts.

One type of hydrogen fuel cells is a proton exchange membrane (PEM) fuel cell. A PEM is a membrane generally made from an ionomer and designed to conduct protons while being impermeable to gases such as oxygen or hydrogen. PEM fuel cells have potential to replace internal combustion engines, the current dominant source of energy for motor vehicles and other such mobile propulsion applications. At the anode electrode of a PEM fuel cell, hydrogen molecules are oxidized to hydrogen ions, i.e., protons, and electrons. The protons permeate across a polymer membrane that acts as an electrolyte (the PEM) while the electrons flow through an external circuit and produce electric power. At the cathode of a hydrogen/air fuel cell, oxygen reacts with electrons and protons that migrate across the PEM to produce water. Thus, in the past decade, the research and development has focused on the membrane composition and structure of the PEM and methods of forming the PEM, where the PEM structure is robust and the manufacturing process thereof is simplified.

Alkaline anion-exchange membrane fuel cells (AAEM-FCs) are a potentially significant technology that could compete with the more popular and well-studied PEM fuel cells for a variety of applications [1]. The alkaline anion exchange membrane (AEM or AAEM) is a membrane generally made from ionomers with positively charged fixed ion-exchange sites and designed to conduct anions while being impermeable to gases such as oxygen or hydrogen. During alkaline fuel cell operation, the membrane conducts hydroxide ions. A fundamental drawback of all AEMs is the fact that hydroxide anions have a lower inherent mobility than protons which adversely affects ionic conduction in an AEM [2]. To compensate for these two problems, membrane researchers have focused their attention on the use of high ion-exchange capacity polymers, but this strategy exacerbates the problems of membrane brittleness in the dry state and poor mechanical strength when the membrane is fully hydrated [3].

Additionally, most fuel cell electrodes are fabricated by a decal method or by catalyst-ink on a carbon paper gas diffusion layer (GDL). The platinum (Pt) catalyst utilization efficiency in such structures is not as high as desired. There has been little research conducted to improve electrode structures and methods of fabricating fuel cell membrane-electrode-assemblies with improved catalyst utilization.

Therefore, a heretofore unaddressed need exists in the art to address the aforementioned deficiencies and inadequacies.

SUMMARY OF THE INVENTION

In one aspect, the present invention relates to a fuel cell membrane-electrode-assembly (MEA). In one embodiment, the fuel cell MEA has an anode electrode, a cathode electrode, and a membrane disposed between the anode electrode and the cathode electrode, where at least one of the anode electrode, the cathode electrode and the membrane is formed of nanofibers by electrospinning.

The membrane is ionically conductive. In one embodiment, the ionically conductive membrane is proton conductive. In one embodiment, the membrane includes nanofibers of an uncharged (or minimally charged) polymer surrounded by a matrix of an ionically conducting polymer. In another embodiment, the membrane includes nanofibers of an ionically conducting polymer surrounded by a matrix of an uncharged (or minimally charged) polymer.

In one embodiment, the uncharged (or minimally charged) polymer is polyphenylsulfone, and the ionically conducting polymer is a perfluorosulfonic acid polymer. In one embodiment, the perfluorosulfonic acid polymer is Nafion®.

In one embodiment, the membrane includes a fiber network, formed from a dual or multi fiber mat of one or more first-type polymer fibers and one or more second-type polymer fibers; and a polymer matrix encompassing the fiber network, where the polymer matrix is formed by softening and flowing at least one of the one or more of the first-type polymer fibers of the dual or multi fiber mat to fill in the void space between the one or more second-type polymer fibers of the dual or multi fiber mat, or by softening and flowing at least one of the one or more of the second-type polymer fibers of the dual or multi fiber mat to fill in the void space between the one or more first-type polymer fibers of the dual or multi fiber mat. The one or more first-type polymer fibers include charged polymer fibers or charged polymer precursor fibers, and the one or more second-type polymer fibers include uncharged polymer fibers.

In one embodiment, the one or more first-type polymer fibers include ionically conducting polymer fibers, and the one or more second-type polymer fibers include uncharged (or minimally charged) polymer fibers. In one embodiment, the uncharged (or minimally charged) polymer is polyphenylsulfone, and the ionically conducting polymer is a perfluorosulfonic acid polymer.

In one embodiment, each of the anode electrode and the cathode electrode includes a catalyst. In one embodiment, the catalyst includes platinum-supported carbon (Pt/C).

In one embodiment, each of the anode electrode and the cathode electrode is formed of nanofibers by electrospinning of a polymer solution containing the catalyst and an ionomer or an uncharged (or minimally charged) polymer. In one embodiment, the ionomer or uncharged (or minimally charged) polymer includes Nafion®.

In one embodiment, the fuel cell MEA further has a first gas diffusion layer disposed between the anode electrode and the membrane; and a second gas diffusion layer disposed between the cathode electrode and the membrane. In one embodiment, at least one of the first and second gas diffusion layers is formed of electrospun nanofibers.

In another aspect, the present invention relates to a method of fabricating a fuel cell MEA having an anode electrode, a cathode electrode, and a membrane disposed between the anode electrode and the cathode electrode. In one embodiment, the method includes fabricating each of the anode electrode, the cathode electrode, and the membrane separately by electrospinning; and placing the membrane between the anode electrode and the cathode electrode, and pressing then together to form the fuel cell MEA.

In one embodiment, the step of fabricating the membrane includes forming one or more first-type polymer solutions from one or more first-type polymers and one or more second-type polymer solutions from one or more second-type polymers, respectively, where each of the one or more first-type polymers includes a charged polymer and each of the one or more second-type polymers includes a uncharged (or minimally charged) polymer; electrospinning, separately and simultaneously, the one or more first-type polymer solutions and the one or more second-type polymer solutions to form a dual or multi fiber mat of one or more first-type polymer fibers and one or more second-type polymer fibers; and processing the dual or multi fiber mat by softening and flowing at least one of the one or more first-type polymer fibers to fill in the void space between the one or more second-types polymer fibers, or by softening and flowing at least one of the one or more second-type polymer fibers to fill in the void space between the one or more first-types polymer fibers, so as to form the membrane.

In one embodiment, the one or more first-type polymer fibers include ionically conducting polymer fibers, and the one or more second-type polymer fibers include uncharged (or minimally charged) polymer fibers. In one embodiment, the uncharged (or minimally charged) polymer is polyphenylsulfone, and the ionically conducting polymer is a perfluorosulfonic acid polymer.

In one embodiment, the step of processing the dual or multi fiber mat by softening and flowing at least one of the one or more first-type polymer fibers includes compressing the dual or multi fiber mat; and thermal annealing the dual or multi fiber mat to soften and flow at least one of the one or more first-type polymer fibers to fill in the void space between the one or more second-type polymer fibers.

In another embodiment, the step of processing the dual or multi fiber mat by softening and flowing at least one of the one or more second-type polymer fibers includes compressing the dual or multi fiber mat; and exposing the dual or multi fiber mat to solvent vapor to soften and flow at least one of the one or more second-type polymer fibers to fill in the void space between the one or more first-type polymer fibers. In one embodiment, the step of processing the dual or multi fiber mat by softening and flowing the at least one of the one or more second-type polymer fibers further includes thermal annealing the dual or multi fiber mat.

In one embodiment, the step of fabricating each of the anode electrode and the cathode electrode includes forming a polymer solution containing a catalyst and an ionomer or an uncharged (or minimally charged) polymer; electrospinning the polymer solution to generate electrospun fibers so as to form a nanofiber mat; and pressing the nanofiber mat to fabricate the electrode. In one embodiment, the catalyst includes Pt/C. In one embodiment, the ionomer or uncharged polymer includes Nafion®.

In yet another aspect of the present invention, a method of fabricating a fuel cell MEA includes fabricating a first nanofiber electrode by electrospinning; sequentially fabricating a nanofiber membrane on the first nanofiber electrode by electrospinning; and sequentially fabricating a second nanofiber electrode on the nanofiber membrane by electrospinning to form the fuel cell MEA, where one of the first and second nanofiber electrodes is an anode electrode, and the other of the first and second nanofiber electrodes is a cathode electrode.

In a further aspect, the present invention relates to an electrochemical device having one or more fuel cell MEAs claimed above.

These and other aspects of the present invention will become apparent from the following description of the preferred embodiments taken in conjunction with the following drawings, although variations and modifications thereof may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment.

FIG. 2 shows $H_2$-air fuel cell performance at about 80° C., 100% relative humidity for an entirely electrospun MEA (E-MEA) compared to a standard MEA (Nafion® 212 membrane with decal electrodes). (■) E-MEA voltage, (□) E-MEA power density, (●) Nafion/decal voltage, and (○) Nafion®/decal power density. The $H_2$ flow rate was about 125 mL/min and the air flow rate was about 500 mL/min. The E-MEA was composed of an about 30 μm thick Nafion®/polyphenylsulfone electrospun membrane in which Nafion was reinforced by polyphenylsulfone nanofibers and the Nafion® loading was about 65 vol %. The E-MEA anode and cathode were electrospun nanofiber mats having about 72 wt % Pt/C, about 13 wt % Nafion®, about 15 wt % PAA. Each electrode had a Pt loading of about 0.15 mg/cm$^2$. The Nafion®/decal MEA was a Nafion® 212 membrane (51 μm thick) with decal electrodes (about 0.15 mg/cm$^2$ Pt loading and was about 77 wt % Pt/C and about 23 wt % Nafion® binder).

DETAILED DESCRIPTION OF THE INVENTION

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term are the same, in the same context, whether or not it is highlighted. It will be appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that when an element is referred to as being "on" another element, it can be directly on the other element or intervening elements may be present there between. In contrast, when an element is referred to as being "directly on" another element, there are no intervening elements present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top", may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower" can, therefore, encompass both an orientation of "lower" and "upper", depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about", "substantially" or "approximately" shall generally mean within 20 percent, preferably within 10 percent, and more preferably within 5 percent of a given value or range. Numerical quantities given herein are approximate, meaning that the term "around", "about", "substantially" or "approximately" can be inferred if not expressly stated.

As used herein, the terms "comprise" or "comprising", "include" or "including", "carry" or "carrying", "has/have" or "having", "contain" or "containing", "involve" or "involving" and the like are to be understood to be open-ended, i.e., to mean including but not limited to.

The terms "proton exchange membrane" or its abbreviation "PEM", as used herein, refer to a membrane generally made from ionomers and designed to conduct protons. The terms "proton exchange membrane fuel cell" or "PEM fuel cell", or its abbreviation "PEMFC", refer to a fuel cell using the PEM.

The terms "anion exchange membrane" or its abbreviation "AEM", as used herein, refer to a membrane generally made from ionomers and designed to conduct anions. The terms "anion exchange membrane fuel cell" or "AEM fuel cell", or its abbreviation "AEMFC", refer to a fuel cell using the AEM.

As used herein, the term "conducting polymer" or "ionomer" generally refers to a polymer that conducts ions. More precisely, the ionomer refers to a polymer that includes repeat units of at least a fraction of ionized units. As used herein, the term "polyelectrolyte" generally refers to a type of ionomer, and particularly a polymer whose repeating units bear an electrolyte group, which will dissociate when the polymer is exposed to aqueous solutions (such as water), making the polymer charged. The conducting polymers, ionomers and polyelectrolytes may be generally referred to as "charged polymers". As used herein, the terms "polyelectrolyte fiber" or "charged polymer fiber" generally refer to the polymer fiber formed by polyelectrolytes or the likes. As used herein, polyelectrolyte, ionomer, and charged polymer can be used interchangeably.

As used herein, the terms "uncharged polymer" or "uncharged (or minimally charged) polymer" generally refer to the polymer that does not effectively conduct ions, particularly to the polymer whose repeating units do not bear an electrolyte group or bear a small number of electrolyte groups, and thus the polymer will not be charged or will have a very small charge when being exposed to aqueous solutions. As used herein, the terms "uncharged polymer fiber" or "uncharged (or minimally charged) polymer fiber" generally refer to the polymer fiber formed by the uncharged/uncharged (or minimally charged) polymer.

As used herein, "nanoscopic-scale", "nanoscopic", "nanometer-scale", "nanoscale", "nanocomposites", "nanoparticles", the "nano-" prefix, and "nanostructure" generally refers to elements or articles having widths or diameters of less than about 1 μm. In all embodiments, specified widths can be smallest width (i.e. a width as specified where, at that location, the article can have a larger width in a different dimension), or largest width (i.e. where, at that location, the article's width is no wider than as specified, but can have a length that is greater). In describing nanostructures, the sizes of the nanostructures refer to the number of dimensions on the nanoscale. For example, nanotextured surfaces have one dimension on the nanoscale, i.e., only the thickness of the surface of an object is between 1.0 and 1000.0 nm. Nanowires have two dimensions on the nanoscale, i.e., the diameter of the tube is between 1.0 and 1000.0 nm; its length could be much greater. Finally, sphere-like nanoparticles have three dimensions on the nanoscale, i.e., the particle is between 1.0 and 1000.0 nm in each spatial dimension. A list of nanostructures includes, but not limited to, nanoparticle, nanocomposite, quantum dot, nanofilm, nanoshell, nanofiber, nanowire, nanotree, nanobrush, nanotube, nanorod, and so on.

The description is now made as to the embodiments of the invention in conjunction with the accompanying drawings. Although various exemplary embodiments of the present invention disclosed herein may be described in the context of fuel cells, it should be appreciated that aspects of the present invention disclosed herein are not limited to being used in connection with one particular type of fuel cell such as a proton exchange membrane (PEM) fuel cell and may be practiced in connection with other types of fuel cells or other types of electrochemical devices such as capacitors and/or batteries without departing from the scope of the present invention disclosed herein.

In accordance with the purposes of this invention, as embodied and broadly described herein, this invention relates to an integration/combination of nanofiber electrodes with a nanofiber-based membrane to create a fuel cell membrane-electrode-assembly (MEA) for an electrochemical device, where each of the nanofiber electrodes and the nanofiber membrane is fabricated by an electrospinning process. Those skilled in the art will recognize that the electrospinning process typically involves applying a high voltage electric field to a spinneret needle containing a polymer solution or polymer melt. Mutual charge repulsion on the surface of the solution overcomes the surface tension such as to produce and eject a thin liquid jet of the solution from the tip of the spinneret needle. As the jet of electrified solution travels towards a collector with a different electric potential, electrostatic repulsion from surface charges causes the diameter of the jet to narrow. The jet may enter a whipping mode and thereby be stretched and further narrowed due to instabilities in the electric field. Solid fibers are produced as the jet dries and the fibers accumulate on the collector to form a non-woven material.

Figure 1:
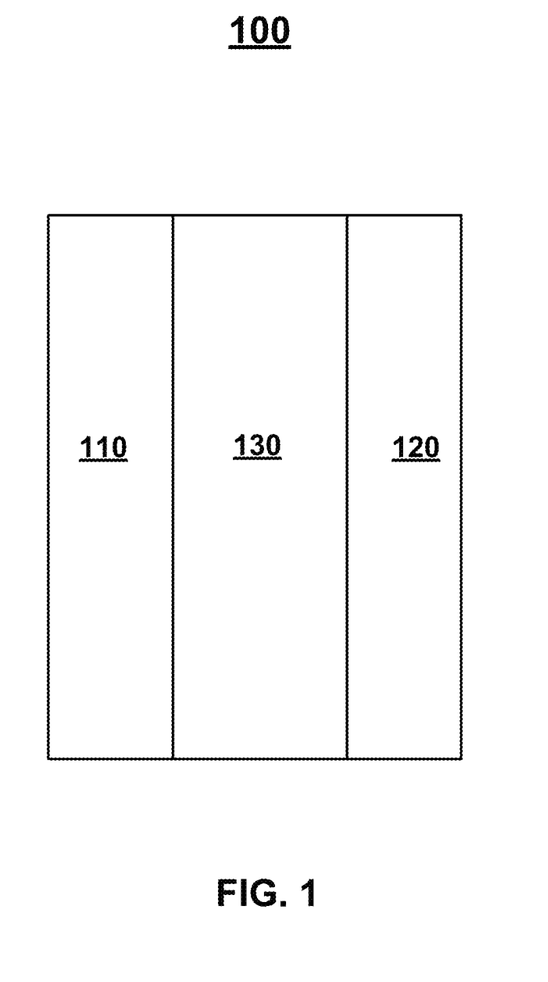
FIG. 1 schematically shows a membrane-electrode-assembly (MEA) formed according to one embodiment of the present invention.

Referring to FIG. 1, an MEA 100 is shown according to one embodiment of the present invention. The MEA 100 in use may be incorporated into an electrochemical device, for example, a proton exchange membrane (PEM) fuel cell. The MEA 100 has an anode electrode 110, a cathode electrode 120, and a membrane 130, where the anode electrode) 10 and the cathode electrode 120 are respectively attached to the opposing surfaces of the membrane 130. In the MEA, one or both electrodes 110 and/or 120 are formed of electrospun nanofibers, and the membrane 130 contains electrospun nanofibers. Embodiments of the nanofiber membrane and the nanofiber electrodes and their fabrications are respectively disclosed in co-pending U.S. patent application Ser. Nos. 13/567,857 and 13/823,968, which are incorporated herein in their entireties by reference. Please refer to the disclosures of co-pending U.S. patent application Ser. Nos. 13/567,857 and 13/823,968 for the details. The following description summarizes only the key features of the nanofiber membrane and the nanofiber electrodes and their fabrications.

The membrane 130 is ionically conductive, or proton conductive. In one embodiment, the membrane includes nanofibers of an uncharged (or minimally charged) polymer surrounded by a matrix of a proton conducting polymer. In another embodiment, the membrane includes nanofibers of a proton conducting polymer surrounded by a matrix of an uncharged (or minimally charged) polymer. In one embodiment, the uncharged (or minimally charged) polymer is polyphenylsulfone, and the proton conducting polymer is a perfluorosulfonic acid polymer. In one embodiment, the perfluorosulfonic acid polymer is Nafion®.

In one embodiment, the membrane includes a fiber network, formed from a dual or multi fiber mat of one or more first-type polymer fibers and one or more second-type polymer fibers; and a polymer matrix encompassing the fiber network, where the polymer matrix is formed by softening and flowing at least one of the one or more of the first-type polymer fibers of the dual or multi fiber mat to fill in the void space between the one or more second-type polymer fibers of the dual or multi fiber mat, or by softening and flowing at least one of the one or more of the second-type polymer fibers of the dual or multi fiber mat to fill in the void space between the one or more first-type polymer fibers of the dual or multi fiber mat. The one or more first-type polymer fibers include charged polymer fibers or charged polymer precursor fibers, and the one or more second-type polymer fibers include uncharged polymer fibers.

In one embodiment, the one or more first-type polymer fibers include proton conducting polymer fibers, and the one or more second-type polymer fibers includes uncharged (or minimally charged) polymer fibers. In one embodiment, the uncharged (or minimally charged) polymer is polyphenylsulfone, and the proton conducting polymer is a perfluorosulfonic acid polymer.

In one embodiment, the membrane is fabricated by the following steps: At first, one or more first-type polymer solutions are formed from one or more first-type polymers and one or more second-type polymer solutions from one or more second-type polymers, respectively. Each of the one or more first-type polymers includes a charged polymer, while each of the one or more second-type polymers includes a uncharged (or minimally charged) polymer. Next, the one or more first-type polymer solutions and the one or more second-type polymer solutions are electrospun, separately and simultaneously, to form a dual or multi fiber mat of one or more first-type polymer fibers and one or more second-type polymer fibers. Then, the dual or multi fiber mat is processed by softening and flowing at least one of the one or more first-type polymer fibers to fill in the void space between the one or more second-types polymer fibers, or by softening and flowing at least one of the one or more second-type polymer fibers to fill in the void space between the one or more first-types polymer fibers, so as to form the membrane.

In one embodiment, the processing step includes the steps of compressing the dual or multi fiber mat; and thermal annealing the dual or multi fiber mat to soften and flow at least one of the one or more first-type polymer fibers to fill in the void space between the one or more second-type polymer fibers.

In another embodiment, the processing step includes the steps of compressing the dual or multi fiber mat; and exposing the dual or multi fiber mat to solvent vapor to soften and flow at least one of the one or more second-type polymer fibers to fill in the void space between the one or more first-type polymer fibers. In one embodiment, the processing step further includes the steps of thermal annealing the dual or multi fiber mat.

In one embodiment, each of the anode and cathode electrodes includes a catalyst. In one embodiment, the catalyst includes platinum-supported carbon (Pt/C).

In one embodiment, at least one of the anode electrode and the cathode electrode is formed of nanofibers by electrospinning of a polymer solution containing the catalyst and an ionomer or an uncharged (or minimally charged) polymer. In one embodiment, the ionomer or uncharged (or minimally charged) polymer includes Nafion®.

In one embodiment, each of the anode electrode and the cathode electrode is fabricated by forming a polymer solution containing the catalyst and the ionomer or an uncharged (or minimally charged) polymer; electrospinning the polymer solution to generate electrospun fibers so as to form a nanofiber mat; and pressing the nanofiber mat to fabricate the electrode.

In one embodiment, each of the anode and cathode electrodes may be coated on one side with a thin catalyst layer, and the anode and cathode electrodes are separated by a PEM. The MEA is disposed between two flow-field plates, and in operation, hydrogen and air or some other fuel and oxidant are provided to the electrodes of the MEA via channels that are formed in the flow field plates. More particularly, one flow-field plate directs hydrogen to the anode and another flow-field plate directs oxygen in the air to the cathode. At the anode, a catalyst layer facilitates separation of the hydrogen into protons and electrons. Free electrons produced at the anode are conducted as a usable electric current through an external circuit. At the cathode, hydrogen protons that have passed through the PEM come together with oxygen in air and electrons that return from the external circuit, to form water and heat.

The fuel cell MEA may also have a first gas diffusion layer disposed between the anode electrode and the membrane; and a second gas diffusion layer disposed between the cathode electrode and the membrane. In one embodiment, the first and second gas diffusion layers are formed of electrospun nanofibers.

In one embodiment, a first entirely electrospun fuel cell MEA has been fabricated (e.g., a fuel cell MEA containing an electrospun anode, an electrospun cathode and an electrospun membrane). The electrospun membrane has been shown to provide enhanced fuel cell durability relative to commercial Nafion® films, while the electrospun electrodes have been shown to provide enhanced fuel cell power output and durability, as compared to conventional/benchmark "decal" electrodes [4, 5]. Thus, the combination of these two materials into a single MEA has considerable advantages over current fuel cell MEA technologies (i.e., decal electrodes on a commercial Nafion® membrane or catalyst coated gas diffusion layers that are hot pressed onto a proton conducting membrane).

In the following example, the electrospun MEA (E-MEA) was constructed by separately preparing an electrospun membrane and electrospun electrodes (anode and cathode) and then hot-pressing the components into a single MEA construct. However, according to the invention, the fuel cell MEA can also be fabricated by forming a first electrospun nanofiber electrode; sequentially forming a electrospun nanofiber membrane on the first electrospun nanofiber electrode; and sequentially forming a second electrospun nanofiber electrode on the electrospun nanofiber membrane to construct the fuel cell MEA, where one of the first and second electrospun nanofiber electrodes is an anode electrode, and the other of the first and second electrospun nanofiber electrodes is a cathode electrode. Additionally, Without intent to limit the scope of the invention, descriptions and processing for the membrane and electrodes are described as follows. In the exemplary embodiment, the membrane is formed such that a proton conducting polymer is reinforced by an electrospun nanofiber mat of an uncharged polymer. Variants of this construct, for example, a membrane is formed such that the uncharged polymer surrounds an electrospun mat of proton conducting nanofibers, or one electrode (e.g., the anode) contains no nanofiber in structure, can also be utilized to the practice the invention.

Preparation of Nanofiber Membrane

Separate Nafion® and polyethylene oxide (PEO) solutions were prepared by dissolving Nafion® powder (prepared by evaporating the solvent from LIQUION 1115, Ion Power, Inc.) and PEO powder (Sigma-Aldrich, 400 kDa MW) into a 2:1 weight ratio n-propanol:water mixture. These two solutions were then combined to form a Nafion®/PEO electrospinning solution where the PEO constituted about 1 wt % of the total polymer content.

A polyphenylsulfone (Radel® R 5500NT, 63 kDa MW, from Solvay Advanced Polymers, LLC) solution was prepared by dissolving polymer powder in an 80:20 wt. ratio of n-methyl-2-pyrrolidone:acetone. The polyphenylsulfone (PPSU) solution and the Nafion®/PEO solution were each drawn into separate syringes and electrospun using a 22 gauge needle (Hamilton Company). PPSU fibers and Nafion®/PEO fibers were simultaneously collected on a rotating aluminum drum that also oscillated laterally to ensure a random distribution and orientation of fibers with a uniform fiber density. The flow rates and concentrations of the Nafion®/PEO and the PPSU were varied to produce fiber mats of varying compositions (i.e., different Nafion® volume fractions). The Nafion®/PEO solution was electrospun at a flow rate of about 0.20 mL/hr and a concentration of about 20 wt %. The PPSU solution was electrospun at a flow rate of about 0.038 mL/hr, at a constant concentration of about 25 wt %. For the Nafion®/PEO electrospinning, a spinneret-to-collector distance (SCD) was fixed at about 6.5 cm and the voltage was set at about 4.15 kV. The PPSU solution was electrospun at about 8.5 kV with an SCD of about 8.5 cm. All electrospinning experiments were performed at room temperature, where the relative humidity was about 35%.

The electrospun dual nanofiber mat was compressed at about 15,000 psi and about 127° C. for about 10 seconds. The sample was rotated 90° three times and successively compressed to ensure even compression. The dual nanofiber mat was then annealed in vacuum at about 150° C. for about 2 hours so as to produce the membrane. The resulting membrane, where PPSU nanofibers are embedded in a Nafion® polymer matrix, was boiled in about 1 M sulfuric acid and deionized water for about one hour each to remove residual PEO and to protonate all ion-exchange sites.

Preparation of Nanofiber Electrode:

An electrospinning cathode dispersion (ink) was prepared by mixing Pt/C particles (about 40% Pt on carbon black, from Alfa Aesar), Nafion® powders (made by drying a LIQUION 1115 solution from Ion Power, Inc.) and poly(acrylic acid) (MW=450,000 g/mol, from Aldrich) in a 2:1 wt ratio isopropanol:water solvent. The total polymer plus powder content of the ink was about 13.4 wt %, where the Pt/C:Nafion®:PAA weight ratio was about 72:13:15.

The ink was pumped out of a needle spinneret (a 22 gauge needle) and deformed into a Taylor cone by the strong applied potential at the needle tip, +7.0 kV relative to a grounded stainless steel rotating drum nanofiber collector. The spinneret-to-collector distance was fixed at about 9 cm, and the flow rate of ink was about 1.5 mL-h$^{-1}$. Nanofibers were collected on an aluminum foil that was fixed to the collector drum (rotating at about 100 rpm). The drum oscillated horizontally to improve the uniformity of deposited nanofibers. Prior to hot-pressing, the electrospun nanofiber mat was pre-compressed between two PTFE sheets under mild pressure (about 217 Pa) and annealed for about 2 hours at about 150° C. under vacuum. The Pt-loading of the nanofiber mat was calculated from its total weight and the weight-fraction of Pt/C catalyst used for its preparation.

MEA Performance in a Fuel Cell

Figure 2:
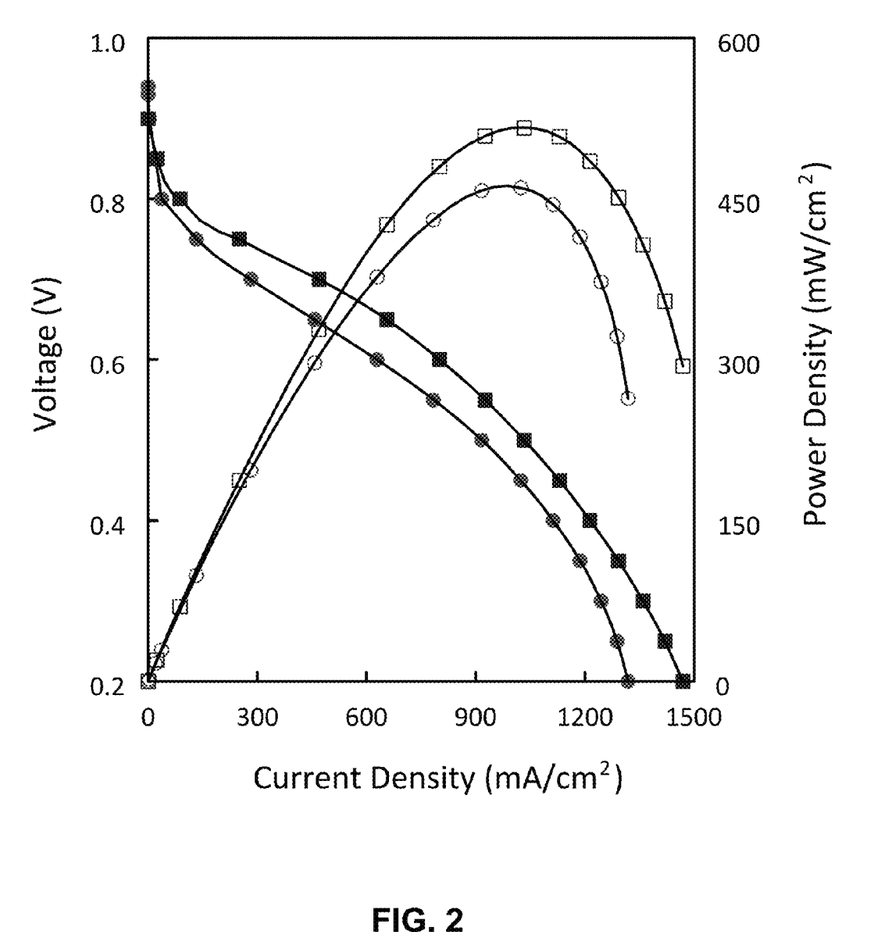

In this exemplary embodiment, the anode and cathode electrodes and the membrane were prepared separately. However, it should be appreciated that E-MEAs could also be fabricated by successively (sequentially) electrospinning nanofibers for the anode, the membrane, and the cathode and then processing the entire E-MEA simultaneously. In the exemplary embodiment, the membrane and electrodes were prepared separately, and the electrospun electrodes were hot-pressed onto the electrospun membrane at about 283° F. and about 100 psi for about 10 minutes. The E-MEA was then loaded into a fuel cell test fixture and pre-conditioned for about 3 hours at about 80° C. by successively running the fuel cell for about 2 minutes at low current density (about 150 mA/cm$^2$) and about 2 minutes at low voltage (about 0.2V). Fuel cell performance at about 80° C. and about 100% relative humidity was then measured with a Scribner Fuel Cell Test Station. For comparison, similar MEA preparation/conditioning steps were performed using a commercial Nafion® membrane and decal electrodes. The Nafion®/decal MEA had the same loading of Pt catalyst in the electrodes (about 0.15 mg/cm$^2$ each for the anode and cathode) and the electrospun MEA. The fuel cell performance for both MEAs is shown in FIG. 2. As can be seen, the E-MEA produced more power than the standard Nafion®/decal MEA at all operating voltages (the measured current density was higher at all cell voltages). At a typical fuel cell operating voltage of about 0.6V, the E-MEA has a power output of about 480 mW/cm$^2$, as compared to about 377 mW/cm$^2$ for a Nafion®/decal MEA, which is a 27% improvement. The maximum power for the E-MEA is about 516 mW/cm$^2$, as compared to about 460 mW/cm$^2$ for the Nafion®/decal MEA.

In sum, the present invention, among other things, recites an entirely electrospun fuel cell MEA containing an electrospun anode, an electrospun cathode and an electrospun membrane, for the first time, which has considerable advantages over a conventional Nafion®/decal MEA.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

LISTING OF REFERENCES

[1]. C. G. Arges, *The Electrochemical Society Interface*, 19, 31 (2010).

[2]. M. R. Hibbs, M. A. Hickner, T. M. Alam, S. K. McIntyre, C. H. Fujimoto and C. J. Cornelius, *Chem Mater*, 20, 2566 (2008).

[3]. D. P. Tang, J. Pan, S. F. Lu, L. Zhuang and J. T. Lu, *Sci. China-Chem.*, 53, 357 (2010).

[4]. J. B. Ballengee and P. N. Pintauro, *Macromolecules*, 44, 7307 (2011).

[5]. W. J. Zhang and P. N. Pintauro, *Chemsuschem*, 4, 1753 (2011).

What is claimed is:

1. A fuel cell membrane-electrode-assembly (MEA), comprising:
   an anode electrode;
   a cathode electrode; and
   a membrane being ionically conductive and disposed between the anode electrode and the cathode electrode,
   wherein each of the anode electrode, the cathode electrode and the membrane is formed of nanofibers by electrospinning; and
   wherein the membrane comprises:

nanofibers of an uncharged (or minimally charged) polymer surrounded by a matrix of an ionically conducting polymer; or nanofibers of an ionically conducting polymer surrounded by a matrix of an uncharged (or minimally charged) polymer and wherein the uncharged (or minimally charged) polymer is polyphenylsulfone.

2. The fuel cell MEA of claim 1, wherein the ionically conductive membrane is proton conductive.

3. The fuel cell MEA of claim 1, wherein the ionically conducting polymer is a perfluorosulfonic acid polymer.

4. The fuel cell MEA of claim 3, wherein the perfluorosulfonic acid polymer is Nafion®.

5. The fuel cell MEA of claim 1, wherein the membrane comprises:

a fiber network, formed from a dual or multi fiber mat of one or more first-type polymer fibers and one or more second-type polymer fibers; and a polymer matrix encompassing the fiber network, wherein the polymer matrix is formed by softening and flowing at least one of the one or more of the first-type polymer fibers of the dual or multi fiber mat to fill in the void space between the one or more second-type polymer fibers of the dual or multi fiber mat, or by softening and flowing at least one of the one or more of the second-type polymer fibers of the dual or multi fiber mat to fill in the void space between the one or more first-type polymer fibers of the dual or multi fiber mat, wherein the one or more first-type polymer fibers comprise charged polymer fibers or charged polymer precursor fibers, and the one or more second-type polymer fibers comprise uncharged polymer fibers.

6. The fuel cell MEA of claim 5, wherein the one or more first-type polymer fibers comprise ionically conducting polymer fibers, and the one or more second-type polymer fibers comprise the uncharged (or minimally charged) polymer.

7. The fuel cell MEA of claim 6, wherein the ionically conducting polymer fibers is a perfluorosulfonic acid polymer.

8. The fuel cell MEA of claim 1, wherein each of the anode electrode and the cathode electrode comprises a catalyst.

9. The fuel cell MEA of claim 8, wherein the catalyst comprises platinum-supported carbon (Pt/C).

10. The fuel cell MEA of claim 8, wherein each of the anode electrode and the cathode electrode is formed of nanofibers by electrospinning of a polymer solution containing the catalyst and an ionomer or a second uncharged (or minimally charged) polymer.

11. The fuel cell MEA of claim 10, wherein the ionomer or second uncharged (or minimally charged) polymer comprises Nafion®.

12. The fuel cell MEA of claim 1, further comprising:

a first gas diffusion layer disposed between the anode electrode and the membrane; and a second gas diffusion layer disposed between the cathode electrode and the membrane.

13. The fuel cell MEA of claim 12, wherein at least one of the first and second gas diffusion layers is formed of electrospun nanofibers.

14. An electrochemical device, comprising one or more fuel cell MEAs claimed in claim 1.

* * * * *